United States Patent
Shoji (10) Patent No.: US 9,234,524 B2
(45) Date of Patent: Jan. 12, 2016

(54) BOUNDARY LAYER CONTROLLED LOGARITHMIC SPIRAL BLADE

(75) Inventor: Hirofumi Shoji, Tempe, AZ (US)

(73) Assignee: MINEBEA CO., LTD., Kitasaku-gun (JP)

( * ) Notice: Subject to any disclaimer, the term of this patent is extended or adjusted under 35 U.S.C. 154(b) by 983 days.

(21) Appl. No.: 13/324,900

(22) Filed: Dec. 13, 2011

(65) Prior Publication Data

US 2013/0149157 A1    Jun. 13, 2013

(51) Int. Cl.
*F04D 29/30* (2006.01)
*F04D 29/28* (2006.01)
*F01D 5/18* (2006.01)
*F01D 5/20* (2006.01)

(52) U.S. Cl.
CPC .............. *F04D 29/281* (2013.01); *F04D 29/30* (2013.01); *F01D 5/186* (2013.01); *F01D 5/20* (2013.01); *Y02T 50/676* (2013.01)

(58) Field of Classification Search
CPC ....... F04D 29/281; F04D 29/30; F01D 5/186; F01D 5/20
USPC ................. 416/176, 177, 179, 182, 183, 185, 416/186 R, 188, 223 B; 415/71
See application file for complete search history.

(56) References Cited

U.S. PATENT DOCUMENTS

| | | | |
|---|---|---|---|
| 3,263,909 A * | 8/1966 | Mazepa | 415/199.3 |
| 7,832,984 B2 | 11/2010 | Harman | |
| 8,007,240 B2 | 8/2011 | Sanagi et al. | |
| 2007/0025846 A1 * | 2/2007 | Harman | 415/206 |

FOREIGN PATENT DOCUMENTS

| | | |
|---|---|---|
| JP | H04-116699 U | 10/1992 |
| JP | H11-223199 A | 8/1999 |
| JP | 2005-155510 A | 6/2005 |
| JP | 2007-2708 A | 1/2007 |
| JP | 2007-535632 A | 12/2007 |

* cited by examiner

*Primary Examiner* — Richard Edgar
(74) *Attorney, Agent, or Firm* — Masuvalley & Partners

(57) ABSTRACT

An impeller structure for a centrifugal fan apparatus includes a circular back plate, a ring-shaped shroud, and a tubular hub. The ring-shaped shroud and the tubular hub are respectively located a predetermined distance above and at the center of said circular back plate. The impeller structure further includes a plurality of blades which are annularly disposed around the tubular hub between the circular back plate and the ring-shaped shroud. Each of the plurality of blades includes a chord with a logarithmic spiral shape, and a mean camber line with an angle of return against the chord.

18 Claims, 12 Drawing Sheets

FIG. 1

Prior Art

BOUNDARY LAYER CONTROLLED LOGARITHMIC SPIRAL BLADE

TECHNICAL FIELD

The present invention relates to an impeller of a centrifugal fan and to a centrifugal fan disposed with the impeller. More specifically, it relates to a new design and orientation of impeller blades for improving the P-Q characteristics and efficiency of the centrifugal fan.

BACKGROUND OF THE INVENTION

High performance fans are used in variety of industrial and laboratory applications such as, for example, heating, ventilating, and cooling systems. The performance and desirability of the fans are measured by the fan efficiency and acoustic level produced during operation. The improvement of fan efficiency will reduce the energy needed to operate the fan and/or increase output airflow and pressure.

Fan efficiency is affected by a number of factors. For example, the efficiency of a drive mechanism such as a motor and the revolving speed of the motor and blades may impact the fan energy efficiency. Another example of efficiency factors may include the clearance between the blades of a fan and an inner surface of the fan housing, as typically seen in axial-fans. The design of the fan housing also impacts the energy efficiency of the fan. Another important factor is the design of fan blades in term of shape and representing some structural advantages their orientation with respect to the rest of the fan.

Many of the efficiency factors discussed above are taken into account when issues of fan efficiency and acoustic noise are investigated. Primarily, the designer's attention is focused on improving the impeller design through unique airfoil blades or twisted flat blade designs. For example, centrifugal fans are categorized by their blades shapes into the following categories; 1) radial fans with flat blades, 2) forward curved fans with forward-curved blades, and 3) backward inclined fan with blades that tilt away from the direction of rotation.

Other structures such as, for example, three-dimensional blades with specific thickness distribution and hollow blades are also proposed. However, none of the above-mentioned structures provide a naturally fluid pathway, mating the blades' design and shape, for increasing air flow pressure and thereby reducing inefficiencies generated by flow separations along surfaces of the blades.

The present invention is proposed in view of the above aforementioned problems. The present invention provides a new design and orientation of impeller blades for improving the P-Q characteristics and energy efficiency of centrifugal fans.

SUMMARY OF THE INVENTION

In accordance with one aspect of the present invention, there is provided an impeller structure for a centrifugal fan apparatus. The impeller structure includes a circular back plate; a ring-shaped shroud located a predetermined distance above the circular back plate; and a tubular hub located at a center of the circular back plate. The impeller structure further includes a plurality of blades annularly disposed around the tubular hub between the circular back plate and the ring-shaped shroud, wherein each of the plurality of blades includes a chord with a logarithmic spiral shape, and a mean camber line with an angle of return against the chord.

In accordance with a second aspect of the present invention, there is provided an impeller structure for a centrifugal fan apparatus. The impeller structure includes a circular back plate; a ring-shaped shroud located a predetermined distance above the circular back plate; and a tubular hub located at a center of the circular back plate. The impeller structure further includes a plurality of blades annularly disposed around the tubular hub between the circular back plate and the ring-shaped shroud, wherein each of the plurality of blades includes a chord with a logarithmic spiral shape, and a mean camber line with an angle of return against the chord. Further, an inclination of leading edge of the plurality of blades are defined by an angle of about 30 to 60 degrees, which is formed between a straight line, connecting a lower root and an upper root of leading edge of the plurality of blades, and an axis of rotation defined as a Z-axis.

In accordance with a third aspect of the present invention, there is provided an impeller structure for a centrifugal fan apparatus. The impeller structure includes a circular back plate; a ring-shaped shroud located a predetermined distance above the circular back plate; a tubular hub located at a center of the circular back plate; and a plurality of blades annularly disposed around the tubular hub between the circular back plate and the ring-shaped shroud, wherein each of the plurality of blades includes a chord with a logarithmic spiral shape, and a mean camber line with an angle of return against the chord.

According to the third aspect of the present invention, a thickness of each of the plurality of blades increases along the camber line from a leading edge to a position of maximum thickness, located at a distance of about $\frac{1}{5}$ to $\frac{1}{3}$ away from said leading edge, and then decreases from said position of maximum thickness to a trailing edge. In addition, a ratio of a distance between the center of the circular back plate to a leading edge lower root of each of the plurality of blades and a distance between the center to an outer periphery of the circular back plate satisfy the condition of $0.35 \leq r/R \leq 0.5$.

Further, according to the third aspect of the present invention, an inclination of leading edge of the plurality of blades are defined by an angle of about 30 to 60 degrees, which is formed between a straight line, connecting a lower root and an upper root of leading edge of the plurality of blades, and an axis of rotation defined as a Z-axis. Moreover, a maximum distance between a curvilinear line, extending along leading edge of the plurality of blades, and a straight line connecting ends of said curvilinear line satisfy the condition of $0 \leq T \leq 0.3$, where L is a length of the straight line. Furthermore, a ratio of a horizontal distance between a lower root and an upper root of leading edge of the plurality of blades and a distance between a center and an outer periphery of the circular back plate (w/R) satisfy the condition of $0.2 \leq w/R \leq 0.4$.

DETAILED DESCRIPTION OF INVENTION

Embodiments of the present invention will be described hereinafter with reference to the accompanying drawings, in which preferred exemplary embodiments of the invention are shown. The ensuing description is not intended to limit the scope, applicability or configuration of the disclosure. Rather, the ensuing description of the preferred exemplary embodiments will provide those skilled in the art with an enabling description for implementing preferred exemplary embodiments of the disclosure. It should be noted that this invention may be embodied in different forms without departing from the spirit and scope of the invention as set forth in the appended claims.

This disclosure relates in general to centrifugal fans disposed with an impeller. More specifically, it relates to a new design and orientation of impeller blades for improving the P-Q characteristics and the efficiency of the centrifugal fans.

Embodiments of the present invention are directed to a new and improved impeller structure for increasing the fluid dynamic power within the centrifugal fans. This is achieved by designing three-dimensional blades having a substantially logarithmic spiral shape. In this way, fluids are enabled to move in their naturally fluid pathway, resulting in an increased pressure of the output airflow and thereby reducing inefficiencies due to the flow separations.

By designing three-dimensional blades with logarithmic spiral shapes, fluids flowing inside the impeller may be defined as a logarithmic spiral function. In a vicinity of an impeller's top surface, the airflow may have only a z-component of velocity. However, the z-component of velocity does not exist in a vicinity of an impeller's bottom surface. As a result, the airflow can be described as a potential flow field of a logarithmic spiral wave due to the x and y components in the vicinity of impeller's bottom surface.

Figure 1:
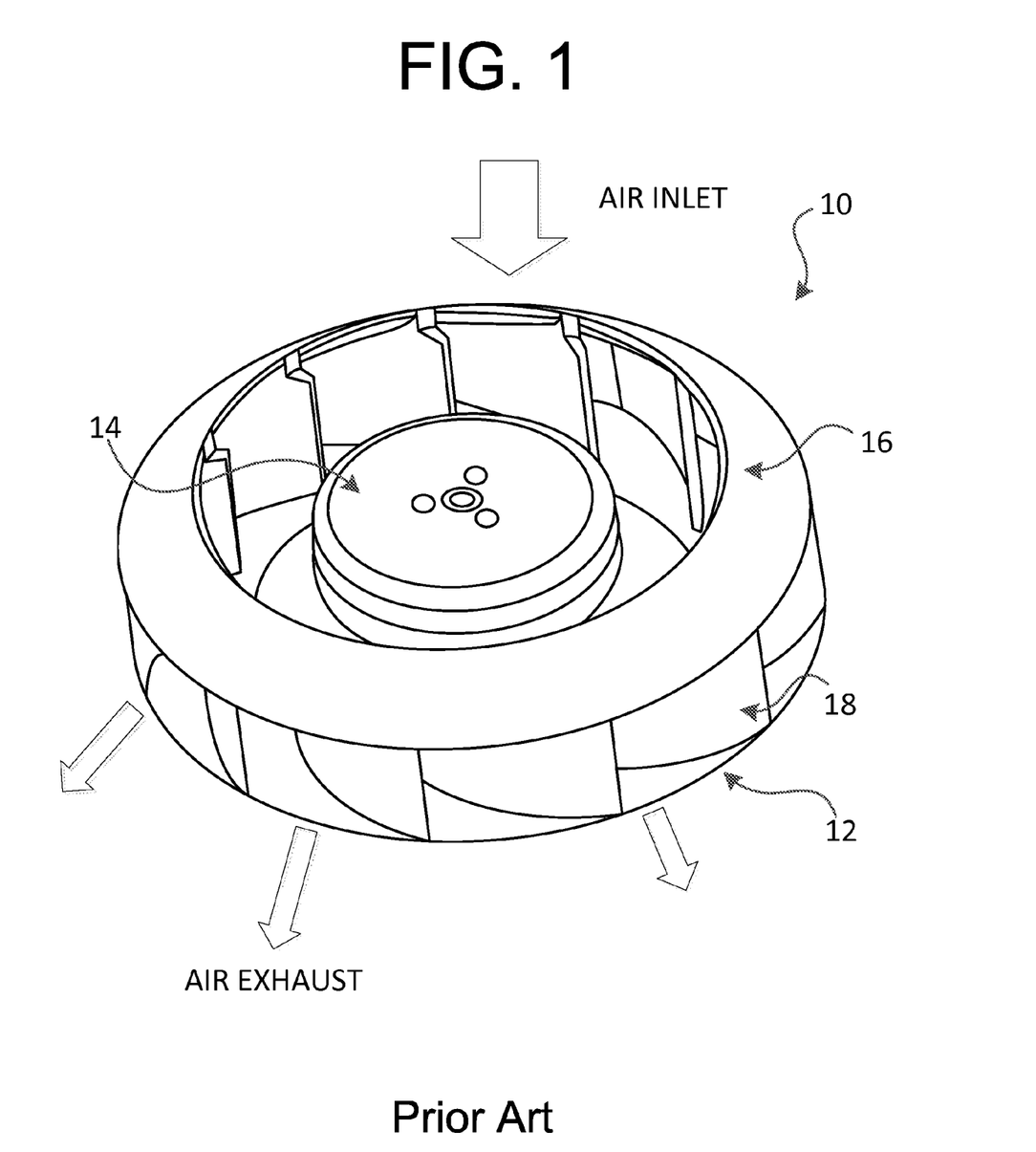
FIG. 1 illustrates a perspective view of a conventional impeller.

In order to appreciate the differences between the prior art and the present invention, a structure of conventional impeller will be first described. FIG. 1 illustrates a perspective view of a conventional impeller 10. The conventional impeller 10 may include a circular back plate 12, a tubular hub 14, and an upper shroud 16. The hub 14 is positioned at the center of the back plate 12 and is operatively coupled to a drive mechanism, e.g., a motor, (not shown in FIG. 1) for rotating the impeller 10.

The conventional impeller 10 further includes a plurality of blades 18 which are attached at one side to the back plate 12 and at the opposite side to the upper shroud 16. As shown in FIG. 1, the blades 18 are forward-curved blades and formed in a rectangular shape with a constant radius. In this example, arrows show the flow of ambient air into the air inlet as well as exhaust air out through the air exhaust means.

Figure 2A:
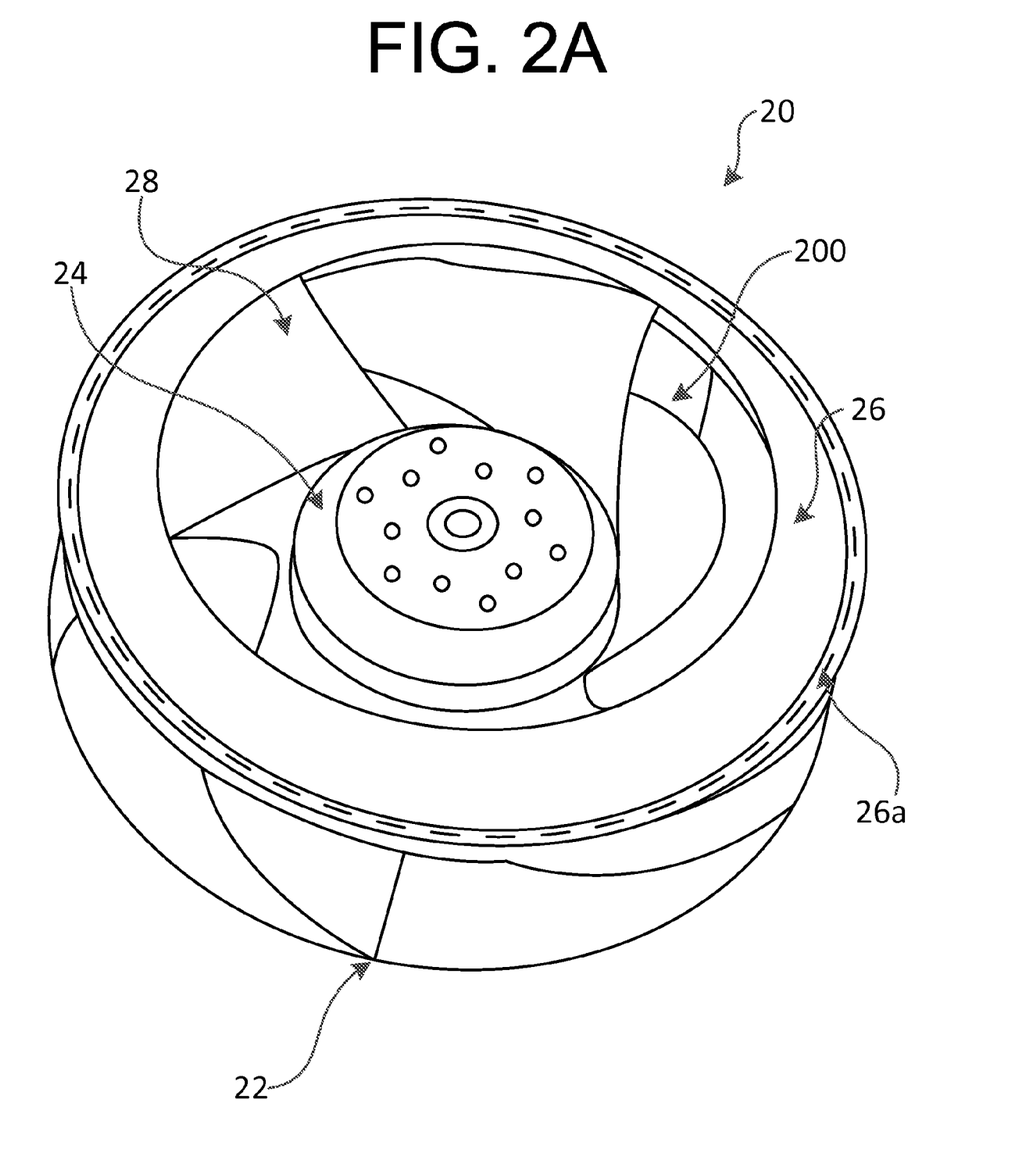
FIGS. 2A and 2B respectively illustrate a perspective view and a cross-sectional view of an embodiment of an impeller according to the present invention.
Figure 2B:
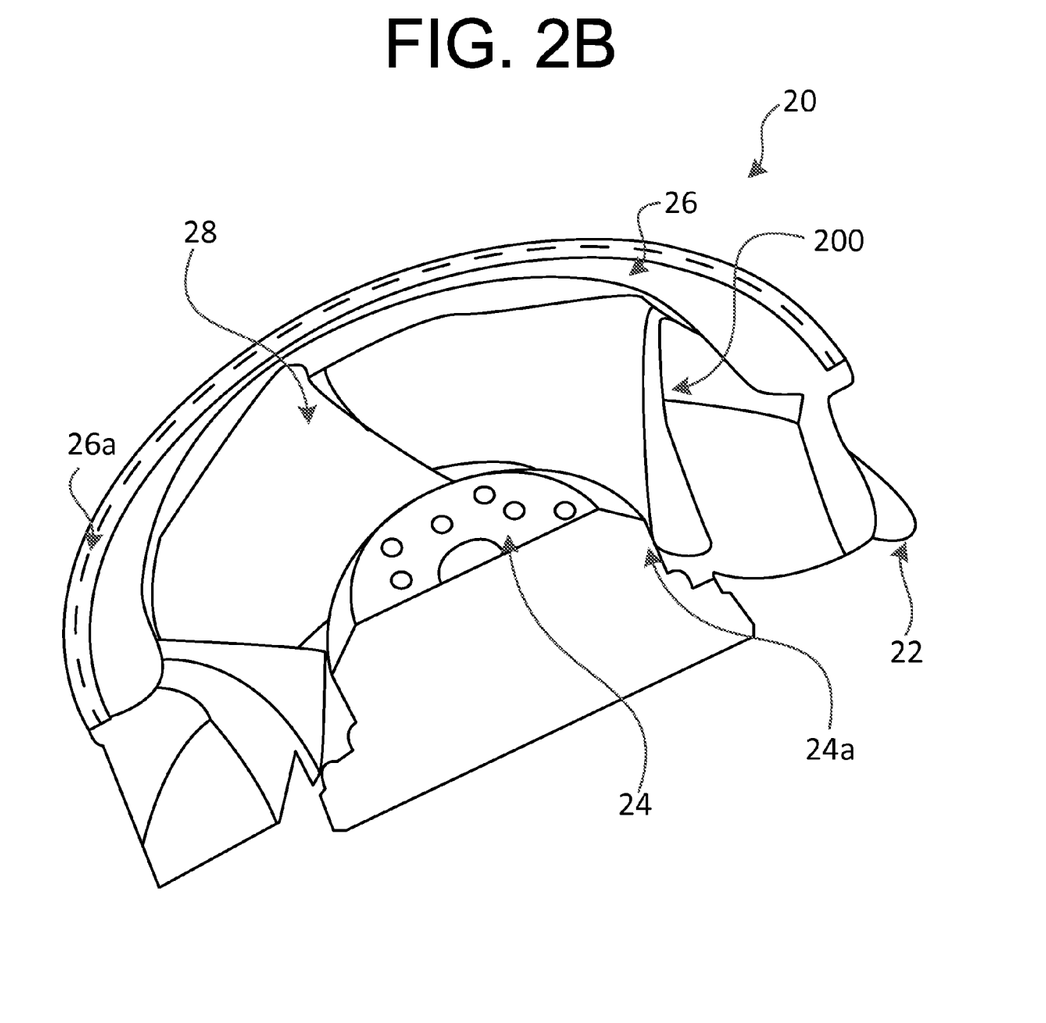

Referring next to the FIGS. 2A and 2B, a perspective view and a cross-sectional view of an embodiment of an impeller 20 are shown respectively according to the present invention.

As shown in these figures, the impeller 20 includes a circular back plate 22, a tubular hub 24, and a ring-shaped shroud 26. Similar to the structure of the conventional impeller 10, the hub 24 is positioned at the center of the back plate 22 and is operatively coupled to a drive mechanism, e.g., a motor, (not shown in FIGS. 2A and 2B) for rotating the impeller 20.

The impeller 20 further includes a plurality of blades 28 which are disposed at one side on the back plate 22 and at the opposite side on the ring-shaped shroud 26. The plurality of blades 28 are positioned such that they are sandwiched between the ring-shaped shroud 26 and the back plate 22. In this embodiment, five blades 28 are formed within the impeller 20 according to the embodiment of the present invention. In addition, concave portions 26a are formed at the outer periphery of the ringed-shape shroud 26 for balancing purposes. It should be noted that according to a preferred embodiment of the present invention, the circular back plate 22, the ring-shaped shroud 26, and the plurality of blades 28 are formed and molded integrally.

As shown in both FIGS. 2A and 2B, the leading edge of blades' lower root are attached to a root portion of the tubular hub 24 (root hub 24a) on the back plate side. On the other hand, on the ring-shaped shroud side, the leading edge of blades' upper root are inclined with a twisting or inclination angle towards the inner surface of the ring-shaped shroud 26. Please see the blade 28 which is located closest to the air inlet opening 200. It should be noted that the twisting or inclination angle toward the inner surface of the ring-shaped shroud 26 may be observed along an entire length of blades 28, but it becomes more pronounced at the leading edge of each blade 28.

With further reference to FIGS. 2A and 2B, it can be also observed that each of the plurality of blades 28 has a curved surface extending along a length of the blade 28, from the tubular hub 24 towards the outer periphery of the impeller 20. In the following, the main characteristics and design criteria related to the blades of a centrifugal fan according to the embodiment of the present invention will be described in detail.

Figure 3:
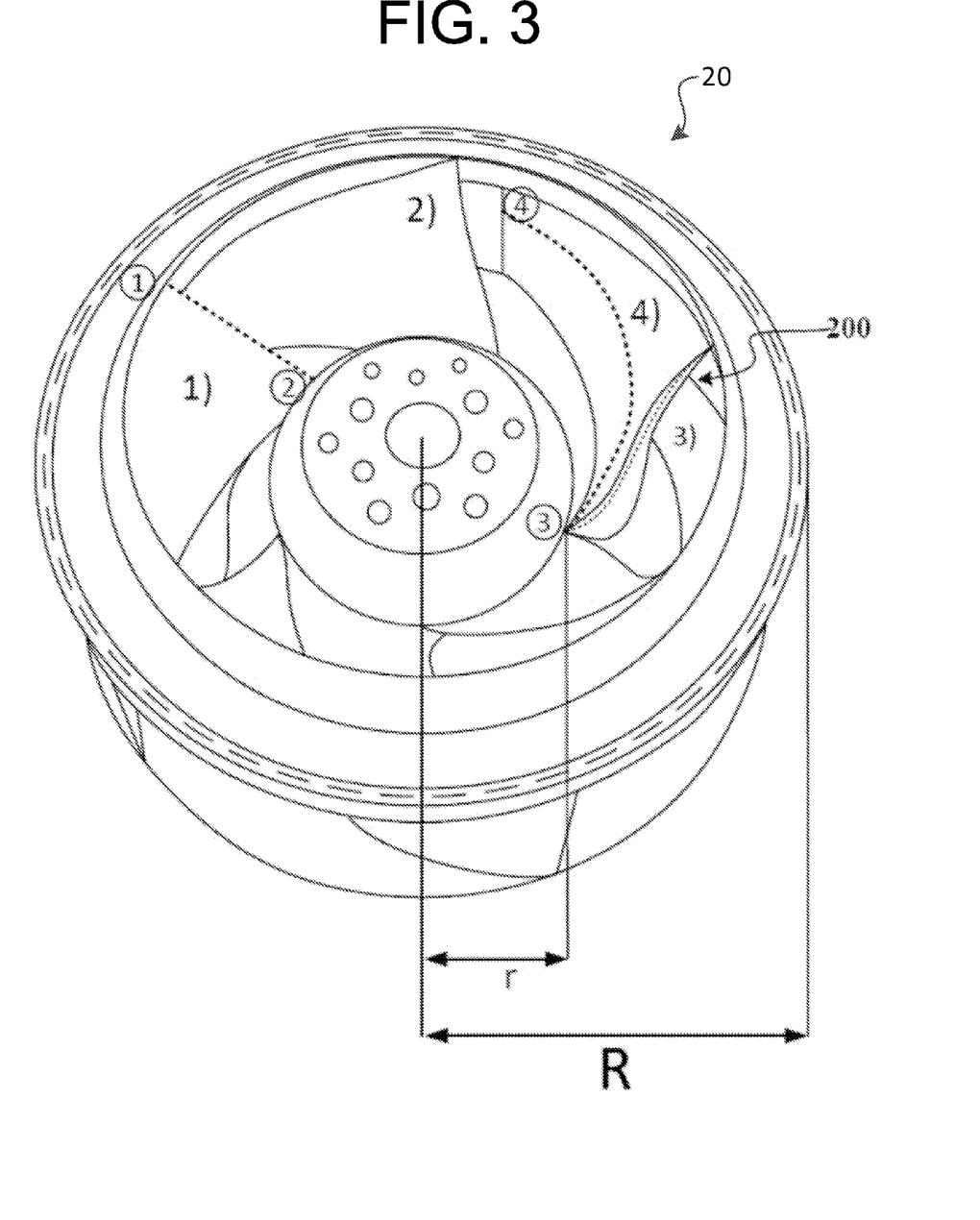
FIG. 3 depicts an explanatory view of an embodiment of an impeller for describing the characteristics of rotating blades.

Referring next to FIG. 3, an explanatory view of the impeller 20 showing the main characteristics and parameters used for designing the rotating blades 28 according to the embodiment of the present invention are shown. A schematic view made by tracing the actual image is also provided with an exaggerated size in order to afford a better understanding. As discussed previously and also shown in FIG. 3, the leading edge of blades 28 are inclined either curvilinearly or linearly against the axis of rotation. Please see respectively the reference points ② and ① and their connecting dotted line from FIG. 3. The air inlet opening 200 positioned in the vicinity of region 3) of FIG. 3 also illustrate the same feature. The shape in which the leading edge of blades 28 are inclined towards the inner surface of the shroud 26 depends upon the twisting or inclination angle, which will be described in more detail further below.

To assure the effect of this invention, it is preferable that the leading edge of blades 28, on the back plate side 22, is positioned in the vicinity of the root hub 24a. For this purpose, it is assumed that a distance between the center of the impeller 20 to the root hub 24a is defined by a radius "r". In addition, it is also assumed that a distance between the center to the outer periphery of the impeller 20 is defined by a radius "R". Please see FIG. 3 for more detail. In the preferred embodiment, a ratio of r/R is within a range between 0.35 and 0.5, if the outer periphery radius R is assumed to be 1.

According to the embodiments of the present invention, the chord line for each of the plurality of three-dimensional blades 28 follows a logarithmic spiral wave defined by the following formula:

$$RL = a * \text{epx}^{\wedge}(b * \theta) \quad (1)$$

where a and b are fixed constants. In this embodiment, the mean camber line, which defines a basic skeleton of the cross-sectional shape for each of the plurality of three-dimensional blades 28, is provided with an angle of return against the chord line. Therefore, the mean camber line according to the embodiment of the present invention is a curve line which has an angle of return or asymmetry against the logarithmic spiral wave of the chord line.

Figure 4:
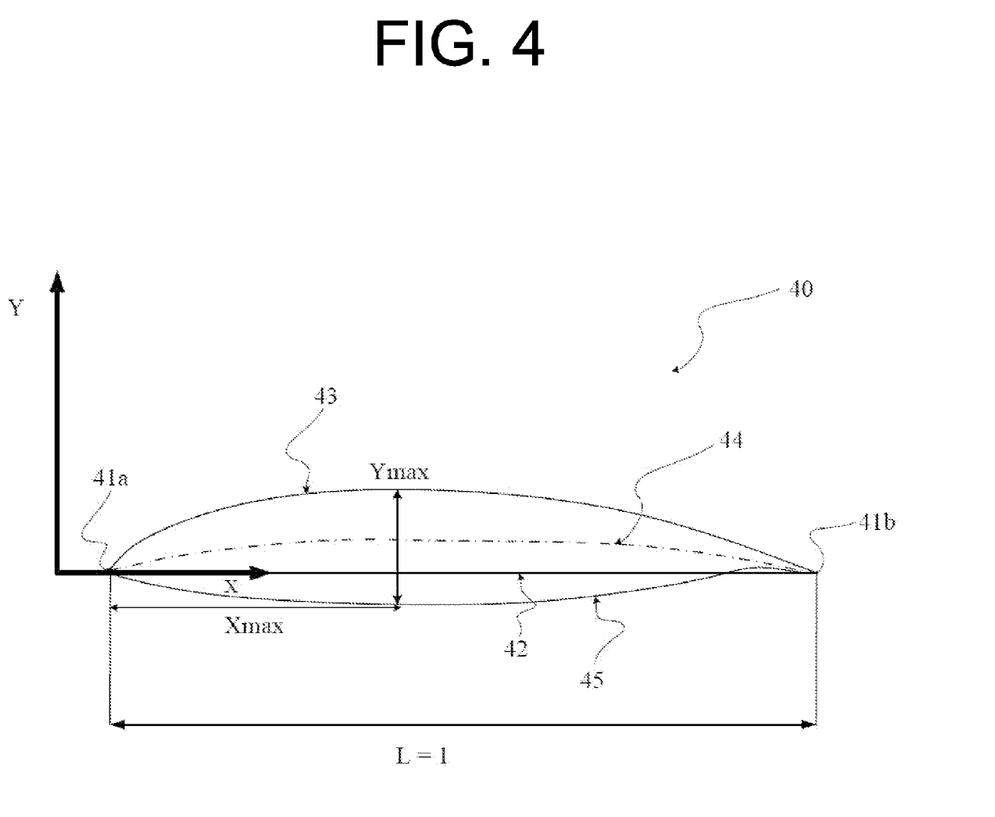
FIG. 4 illustrates schematically the main components of an exemplary airfoil.

For a better understanding of the present invention, a cross-sectional view of a blade with a linear flow motion, e.g., aircraft wings, will be described in detail. More specifically, the differences between the chord line and the camber line as defined above will be described in further detail. FIG. 4 illustrates schematically a cross-sectional view of an exemplary airfoil 40 and its main design components. As shown in this figure, an estimate of the velocity vector field may be obtained using the following assumptions; considering the direction of movement of the blade's cross-section (curved lines 43 and 45), the velocity of the blades may be defined as $V_b = -X$. On the other hand, the fluid velocity, e.g., airflow direction, which is in the opposite direction of the blade's movement, may be defined as $V_b = X$.

Accordingly, the chord line 42, which is a straight line parallel to the X-axis extending between the leading edge 41*a* and the trailing edge 41*b* of the airfoil 40, is parallel to the airflow direction. The mean camber line 44, which also connects the leading and trailing edges 41*a* and 41*b* of the airfoil 40, is defined as the locus of points halfway between the upper and lower surfaces (43 and 45) of the airfoil 40. The mean camber line of the exemplary airfoil 40 may also be defined as the ratio of the angle of return, which is curvilinear, against the linear chord line 42.

Contrary to the above-mentioned exemplary airfoil 40, fluids flowing inside the impeller 20 of the present invention are not a liner motion but are moving in their naturally fluid pathway with a logarithmic spiral shape. Therefore, the fluid flow pathway extends in a logarithmic spiral shape mating the blades' surface curvature within the impeller 20 of the present invention. In this way, the output air flow may be defined as a logarithmic spiral function, e.g., fluid flow (logarithmic spiral). By analogy, the chord line for each of the plurality of blades 28 may be defined as a logarithmic spiral function and thus the mean camber line which is a measure of curvature of the blades 28 is provided with an angle of return against the logarithmic spiral.

Another important aspect of the present invention relates to the surface curvature of the blades 28. As shown in FIG. 3, the surface of each of the plurality of blade 28 is curved while the blades 28 are extending from the root hub 24*a* towards the outer periphery of the impeller 20. Please see respectively the reference points ③ and ④ and their connecting dotted line along the surface of one of the blades indicated by region 4) in FIG. 3. As discussed previously, the chord line for each of the plurality of blades 28 follows a logarithmic spiral wave (chord=logarithmic spiral wave) and the mean camber line, which defines a basic skeleton of the cross-sectional shape for each of the plurality of blades 28, is formed based on the chord line with some "angle of return". Therefore, the surface of each of the plurality of blades 28 is constructed with some thickness-distributions along the mean camber line. It should be noted and emphasized that the logarithmic spiral wave, according to the embodiments of the present invention, does only apply to the cord line and not the surface curvature of the plurality of blades 28.

Another important design factor is the thickness of the plurality of blades 28. The thickness of each of the plurality blades 28 increases from the leading edge of the blade 28 to a position of maximum thickness ($Y_{max}$), which is located between the leading and trailing edges ($X_{max}$). Then, the thickness decreases from said position of maximum thickness to the trailing edge of the blade 28. In the preferred embodiments, the position of maximum thickness ($Y_{max}$) is located at a distance of about ⅕ to ⅓ away from the leading edge ($X_{max}$), e.g., air inlet or front-end, of the blades 28. Please refer to FIG. 4 for more detail.

As discussed previously, the leading edge of the plurality of blades 28 are inwardly inclined towards the inner surface of the ring-shaped shroud 26 with a twisting or inclination angle. As it will be described further below in greater detail, the inward inclination of each of the plurality of blades 28 is originated from a continuous curvilinear line drawn between several cross-sectional profiles taken at different points along the Z-axis.

In order to define the twisting or inclination angle, the axial height of the impeller 20 are taken into consideration. In this case, a logarithmic spiral wave (=chord) of a blade profile at a given height (z) along the Z-axis satisfies the following equation:

$$RL(z) = a(z) * \text{epx}^{\wedge}(b(z) * \theta), \ 0 < z < A \quad (2)$$

where the bottom surface of the impeller 20 or the back plate 22 is positioned at z=0 while the upper surface of the impeller 20 or the ring-shaped shroud 26 is located at z=A.

Figure 5:
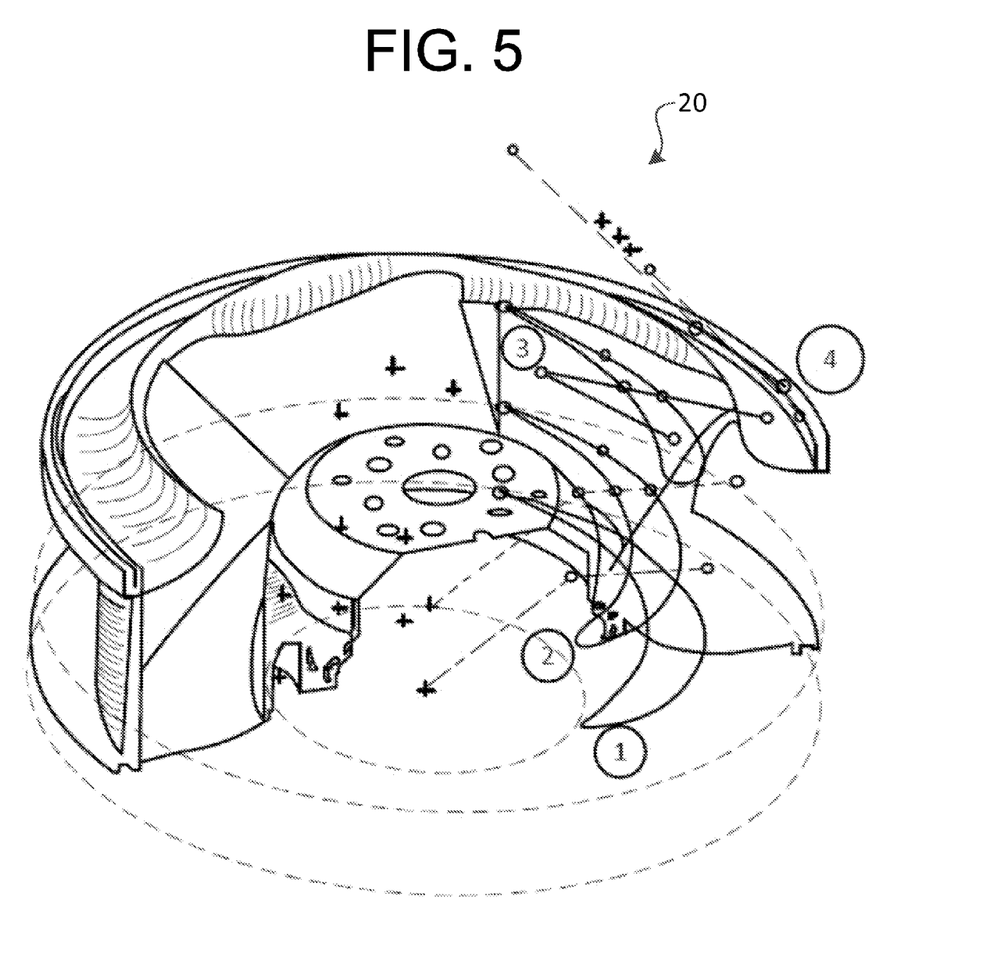
FIG. 5 illustrates a cross-sectional view of an embodiment of an impeller showing several cross-sectional profiles of individual blades taken at different points along the Z-axis.

Referring next to FIG. 5, a cross-sectional view of the impeller 20 illustrating several cross-sectional profiles of individual blades taken at different points along the Z-axis are shown. Similar to FIG. 3, a schematic view made by tracing the actual image is also provided with an exaggerated size in order to afford a better understanding. To determine the twisting or inclination angle ω, three to five cross-sectional profiles taken along the Z-axis at different points are required. Please refer to FIG. 5 for more detail.

In this exemplary embodiment, four cross-sectional profiles, e.g., ①, ②, ③, and ④ are taken along the z direction at the following points:

cross-sectional profile ① corresponding to a horizontal cut taken at z=0, which defines the back plate 22 or the bottom surface of the impeller 20, cross-sectional profile ② corresponding to a horizontal cut taken at ⅕*A<z<⅓*A, cross-sectional profile ③ corresponding to a cut taken at ½*A<z<⅔*A, and cross-sectional profile ④ corresponding to a cut taken at z=A, which is tangent to the ring-shaped shroud 26 or the upper surface of the impeller 20.

Please note that the cross-sectional profile ③ is taken at an angle which is formed between the XY-plane and the cross-sectional profile ④.

Figure 6:
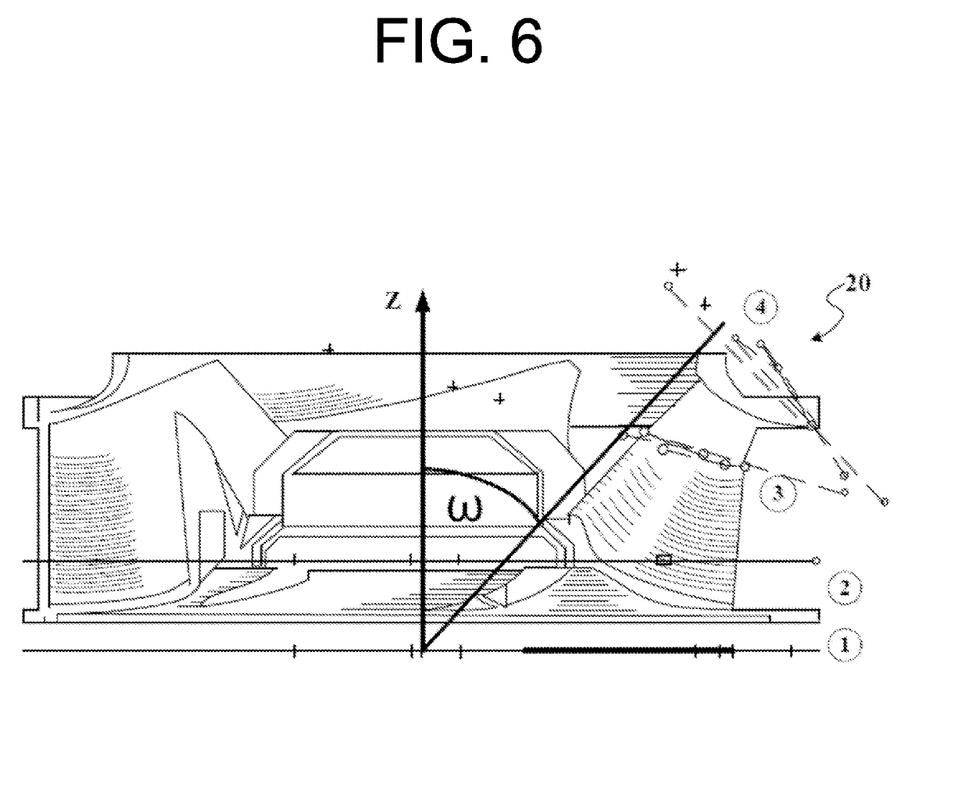
FIG. 6 depicts a side view of an embodiment of an impeller illustrating the same cross-sectional profiles as shown in FIG. 5.

FIG. 6 illustrates a side view of the impeller 20 exhibiting the same cross-sectional profiles as shown in FIG. 5. Similar to FIGS. 3 and 5, a schematic view made by tracing the actual image is also provided with an exaggerated size in order to afford a better understanding. As shown in FIG. 6, the cross-sectional profiles ① and ② are taken at a right angle to the Z-axis and therefore they are substantially parallel to the XY plane, e.g., back plate 22 or bottom surface of impeller 20. On the other hand, the cross sectional plots ③ and ④ are not parallel to the XY plane. This is due to the fact that the fluid flow pathway is designed in a logarithmic spiral shape inside the impeller 20. Therefore, the fluid flows in a generally logarithmic spiral flow pattern inside the impeller 20 such that the fluid circulation is different in the vicinity of impeller's upper surface, e.g., shaped-ring shroud 26, than in the vicinity of impeller's lower surface, e.g., back plate 22.

In the vicinity of the shaped-ring shroud 26 or the impeller's upper surface, the airflow may have only a z-component of velocity. However, in the vicinity of the back plate 22 or the impeller's lower surface, the airflow mainly has a logarithmic spiral profile without any z-component. As a result, the fluid flow represents only the x and y components of transverse force. As shown in FIG. 6, a continuous line drawn between the cross-sectional profiles ③ and ④ forms an angle ω with the Z-axis. The angle ω is defined as the twisting or the inclination angle.

According to the embodiment of the present invention, the continuous line may by drawn between several cross-sectional profiles, either linearly or curvilinearly, depending on the twisting or inclination angle ω. Thus, the twisting or inclination angle ω may be determined by the angle ω and the position at which the cross-sectional profiles are taken. In the preferred embodiment, the twisting or inclination angle ω is within a range between 30°<ω<60°. It is to be understood that one cross-sectional view on each of the impeller's bottom and upper surfaces are acceptable for obtaining the twisting or inclination angle ω.

Figure 7:
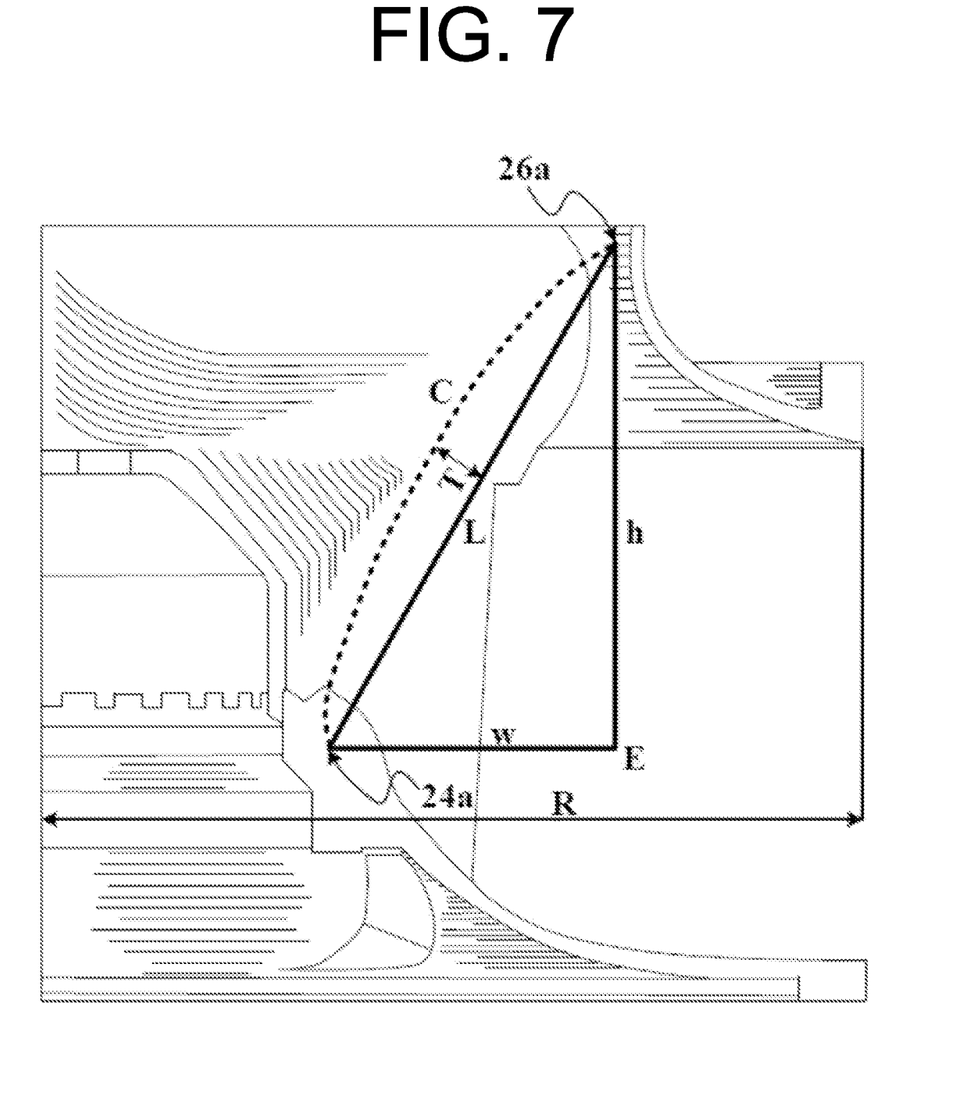
FIG. 7 illustrates an enlarged view of a distal region of the side view of FIG. 6.

With reference to FIG. 7, an enlarged view of a distal region of FIG. 6 is shown. Similar to the previous cases, a schematic view made by tracing the actual image is also provided with an exaggerated size in order to afford a better understanding. As shown in this figure, a dotted line C with a curvilinear shape defines the inclination of the leading edge of one of the plurality of blades 28. A straight line L joins the ends of the dotted line C by connecting a blade's bottom root 24*a* (hub root 24*a*) to its blade's upper root 26*a*. According to the embodiment of the present invention, the angle formed between the straight line L and the Z-axis defines the twisting or inclination angle ω of the leading edge of one of the plurality of blades 28. Assuming the maximum distance between the dotted line C and the straight line L is defined as T. A value of distance T may be defined as a function of the length of the straight line L. In the preferred embodiment, the value of distance T at its largest salient is within a range between 0 and 0.3 L. It should be noted that the dotted line C overlaps with the straight line L when the value of distance T is equal to 0.

Another factor that plays an important role in the design of impeller 20 according to the embodiment of the present invention is the measure of a planar width of the plurality of blades 28. With further reference to FIG. 7, the planar width of the plurality of blades 28 may be defined as the distance between the blade's bottom root located at the root hub 24*a* and an intersection point E. The intersection point E, shown schematically in FIG. 7, is the intersection between a horizontal line w drawn from the blade's bottom root and a vertical line h drawn from the blade's upper root 26*a*.

It is to be understood that the horizontal line w is parallel to XY plane while the vertical line h is parallel to the Z-axis. Referring back to FIG. 3, the distance from the center of the hub 24 to the outer periphery of the impeller 20 is defined by the radius "R". In the preferred embodiment, a ratio of w/R is within a range between 0.2 and 0.4, if the outer periphery distance, radius R, is assumed to be 1.

Figure 8:
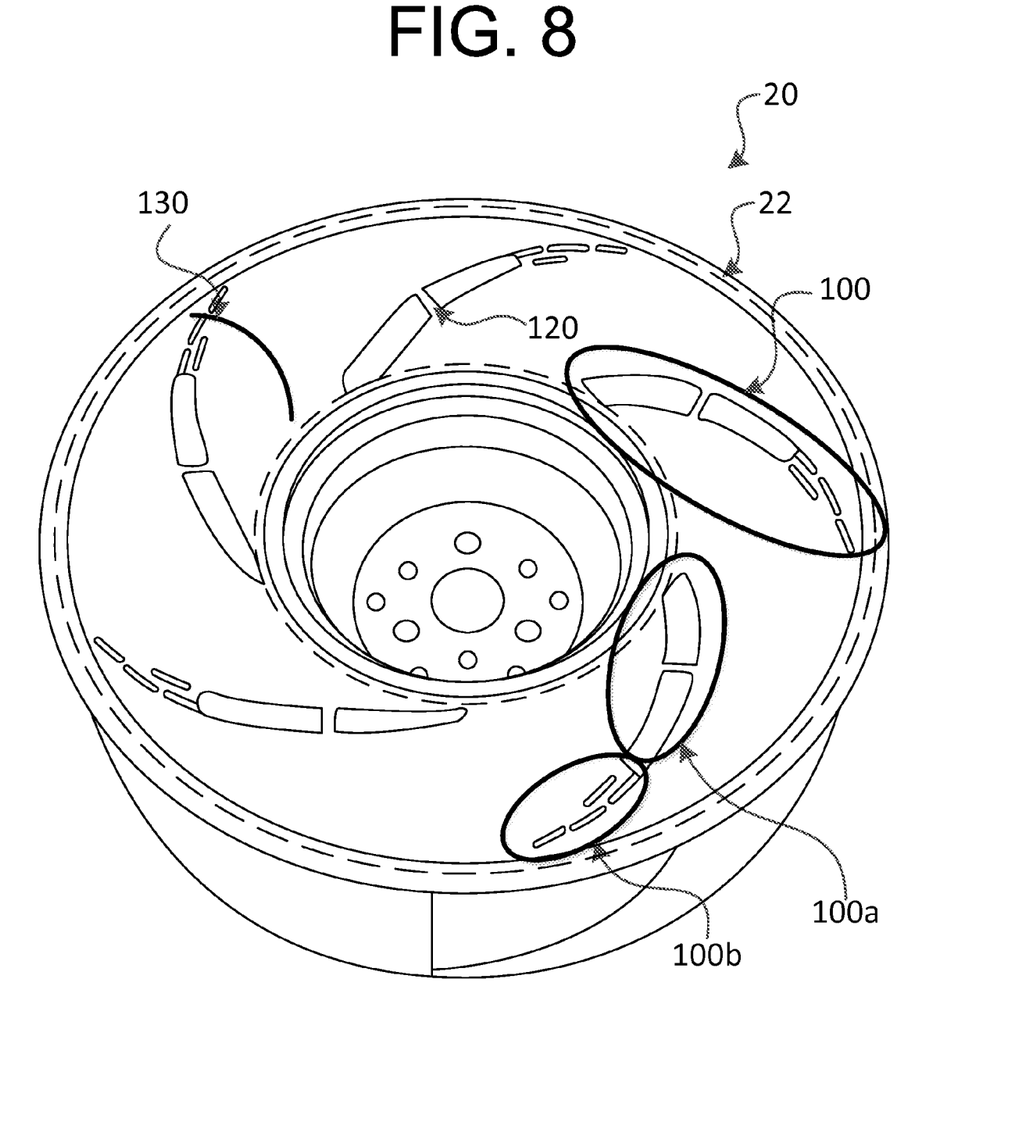
FIG. 8 depicts an explanatory view of an embodiment of a back side of an impeller.

In the following description, an embodiment of the back plate 22 or a backside of the impeller 20 will be described in detail. FIG. 8 illustrates an explanatory view of the back side of the impeller 20. As shown in this figure, a hollow structure is used for forming the plurality of blades 28 such that the overall weight of the impeller as well as materials used in manufacturing of the blades are reduced. The hollow structure includes concave portions 100 provided on the back side of the impeller 20 or on the outer surface of the back plate 22. These concave portions 100 are broadly divided into two groups.

The first group of concave portions 100*a* is made for equalizing the thickness of blades 28. As discussed previously, the thickness of each of the plurality blades 28 increases from the leading edge of the blade 28 to a position of maximum thickness ($Y_{max}$), which is located between the leading and trailing edges ($X_{max}$). Then, the thickness decreases from said position of maximum thickness to the trailing edge of the blade 28. The first group of concave portions 100*a* covers the thicker part of blades 28, which corresponds to a radial distance of about 0.8 away from the center of the back side of the impeller 20 or the outer surface of the back plate 22.

The second group of concave portions 100*b* is made for balancing purposes and is arranged around the outer periphery of the back side of the impeller 20 or the outer surface of the back plate 22. For placing the balancing weights, it is preferable that the concave portions 100*b* (slot-positions) are positioned in a region which is closer to the outer periphery of the back plate 22.

Figure 9:
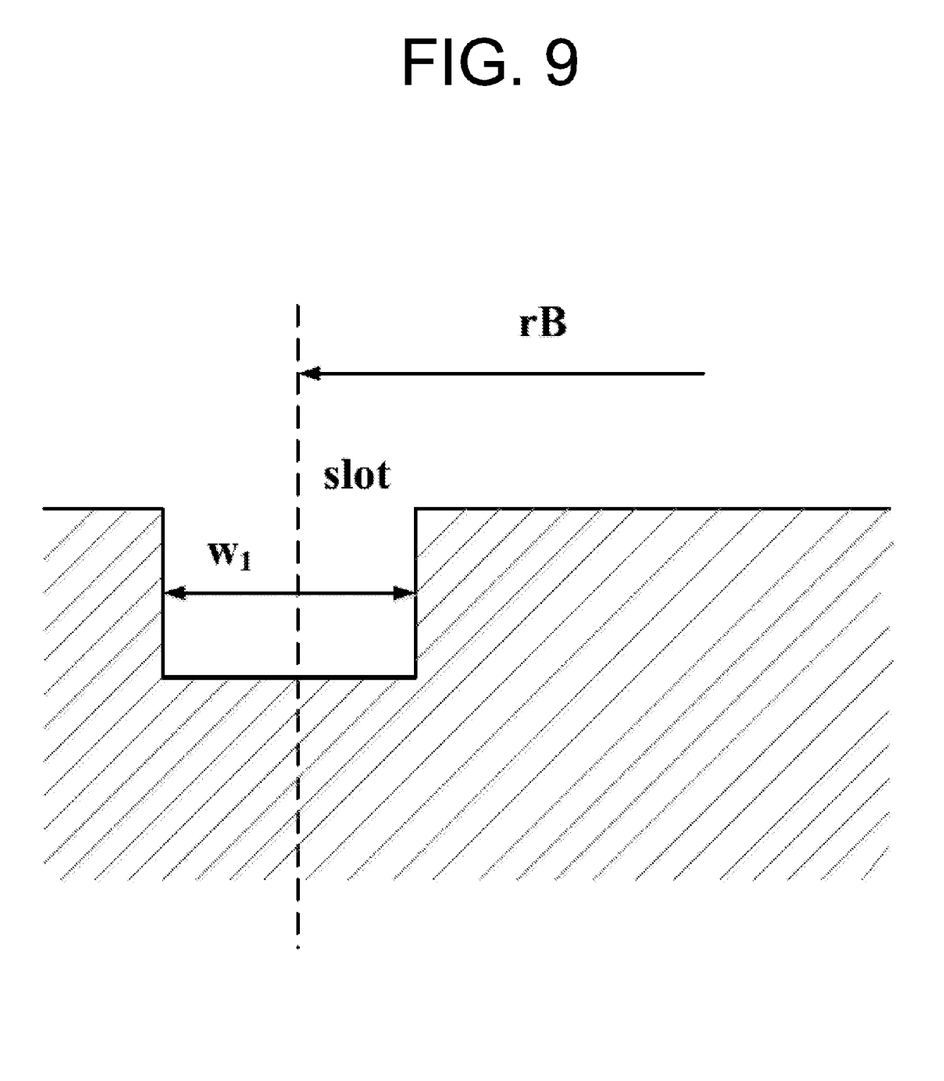
FIG. 9 illustrates schematically a slot position having a certain width for placing balancing weights.

Assuming a distance from the center to the concave portions 100*b* (slot-positions) is defined by a radius "rB". It is also assumed that the distance from the center to the outer periphery of the back plate 22 is defined by the radius "R". In the preferred embodiment, a ratio of rB/R is within a range between 0.8 and 1, if the outer periphery radius R is assumed to be 1. As schematically shown in FIG. 9, the concave portions 100*b* (slot-positions) may include a certain width $w_1$, therefore the above-mentioned positions would be defined in relation to the center of the width $w_1$, and thus a ratio rB/R equal to zero is not possible.

With further reference to FIG. 8, one or more enforcing ribs 120, preferably not more than three, may also be provided between the concave portions 100*a*. Moreover, a central concave portion 130 is formed along the bottom surface of impeller 20, in order to further thin and lighten the impeller structure of the present invention.

Figure 10:
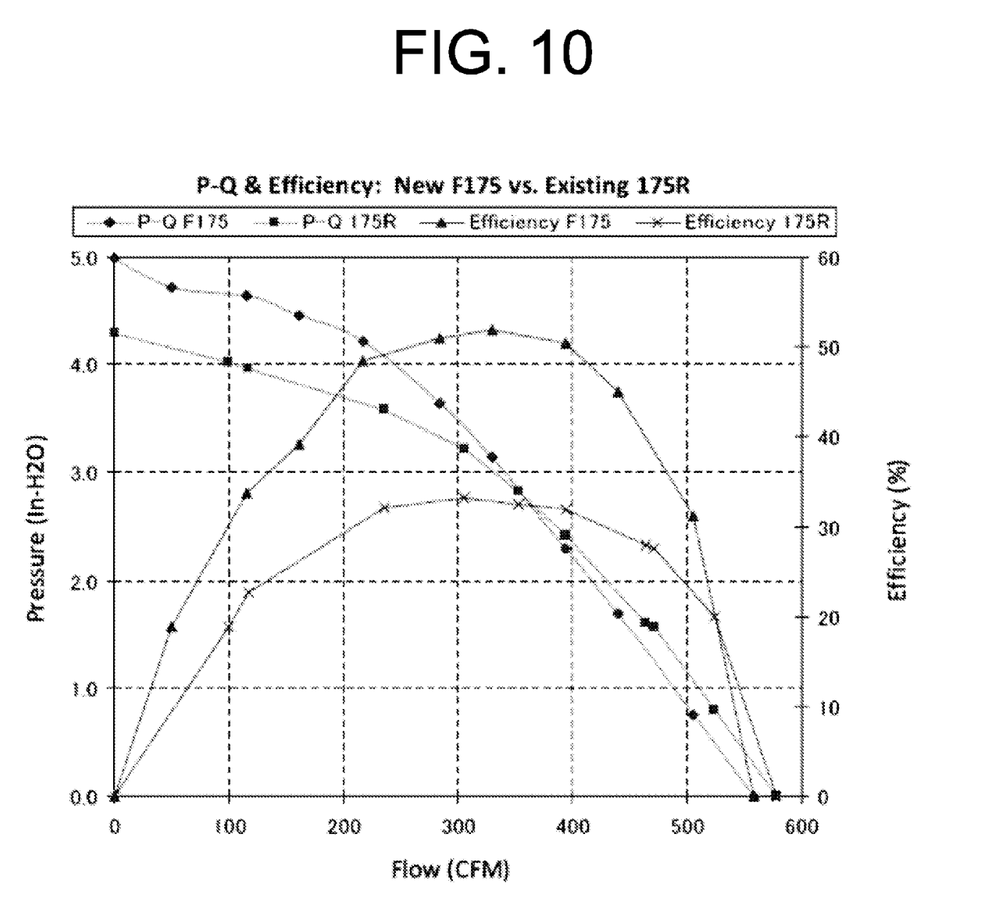
FIG. 10 illustrates performance results, P-Q characteristics and energy efficiency, of an impeller of the present invention and a conventional one.

FIG. 10 illustrates the P-Q characteristics and fan efficiency of two impeller structures. The first impeller structure (F175) is designed and manufactured according to the embodiments of the present invention (FIGS. 2A and 2B), while the second impeller structure (175R) corresponds to the conventional impeller 10 (FIG. 1).

As shown in FIG. 10, the impeller structure of the present invention (F175) shows higher fan efficiency over the entire range of the operating volume flow rate Q. The optimum range of the volume flow rate for operating both impeller structures is approximately within 200 cfm to 500 cfm. As shown in this figure, the fan efficiency is increased about 15% for the impeller structure of the present invention (F175) over the optimum range of the volume flow rate Q. It should be noted that although higher static pressure P is observed when the volume flow rate Q increases and up until it reaches about 300 cfm, however, no significant differences is observed between the static pressure P of both impeller structures.

Figure 11:
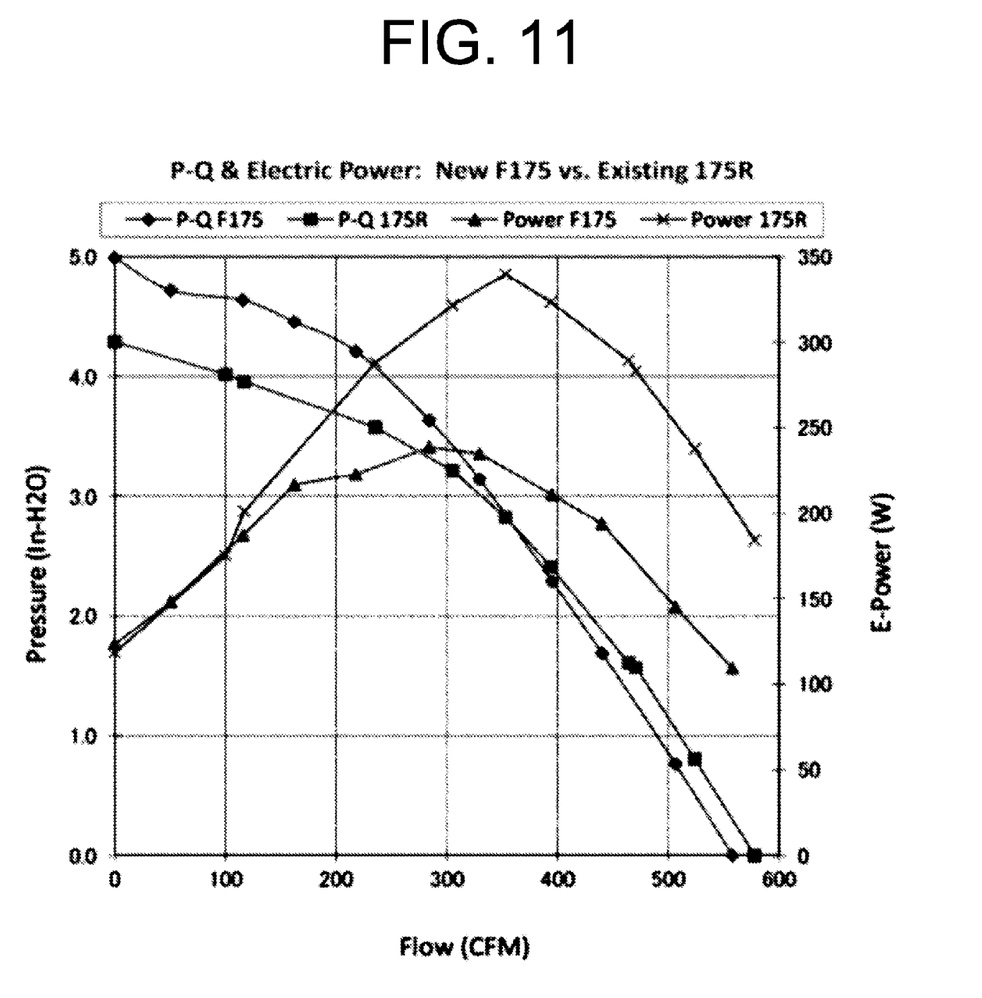
FIG. 11 illustrates performance results, P-Q characteristics and electric power consumptions, of an impeller of the present invention and a conventional one.

FIG. 11 illustrates the electric power for both impeller structures over the entire range of the operating volume flow rate Q. For the sake of convenience, the P-Q characteristics of both impeller structures are also shown in this figure. As shown in FIG. 11, the electric power consumption is reduced significantly in the case of impeller structure of the present invention (F175). As shown in this figure, a decrease in electric power consumption of about 40 W to 100 W is observed over the optimum range of the volume flow rate Q, which results in a significant increase (about 15%) in energy efficiency of the impeller of the present invention (F175).

While the principles of the disclosure have been described above in connection with specific apparatuses and methods, it is to be clearly understood that this description is made only by way of example and not as limitation on the scope of the invention.

What is claimed is:

1. An impeller structure for a centrifugal fan apparatus, the impeller structure comprising:
   a circular back plate;
   a ring-shaped shroud located a predetermined distance above the circular back plate;
   a tubular hub located at a center of the circular back plate; and
   a plurality of blades annularly disposed around the tubular hub between the circular back plate and the ring-shaped shroud, a chord line of each of the plurality of blades following a logarithmic spiral wave, a mean camber line of each of the plurality of blades provided with an angle of return against the logarithmic spiral function of the chord line, and a surface curvature of each of the plurality of blades distinct from the logarithmic spiral wave;
   wherein a thickness of each of the plurality of blades increases along the mean camber line from a leading edge to a position of maximum thickness located at a distance of about ⅕ to ⅓ away from said leading edge and then decreases from said position of maximum thickness to a trailing edge.

2. The impeller structure as recited in claim 1, wherein, for each of the plurality of blades, a maximum distance between a curvilinear line extending along a leading edge of said each blade and a straight line connecting ends of said curvilinear line is defined by:

$$0 \leq T \leq 0.3L$$

wherein L is a length of the straight line.

3. The impeller structure as recited in claim 1, wherein each of the plurality of blades has a curved surface extending along a length of the plurality of blades from the tubular hub towards an outer periphery of the impeller structure.

4. An impeller structure for a centrifugal fan apparatus, the impeller structure comprising:
   a circular back plate;
   a ring-shaped shroud located a predetermined distance above the circular back plate;
   a tubular hub located at a center of the circular back plate; and
   a plurality of blades annularly disposed around the tubular hub between the circular back plate and the ring-shaped shroud, a chord line of each of the plurality of blades following a logarithmic spiral wave, a mean camber line of each of the plurality of blades provided with an angle of return against the logarithmic spiral function of the chord line, and a surface curvature of each of the plurality of blades distinct from the logarithmic spiral wave;
   wherein a ratio of a distance r between a center of the impeller to a leading edge lower root of each of the plurality of blades and a distance R between the center of the impeller to an outer periphery of the impeller satisfies the following condition:

$$0.35 \leq r/R \leq 0.5.$$

5. An impeller structure for a centrifugal fan apparatus, the impeller structure comprising:
   a circular back plate;
   a ring-shaped shroud located a predetermined distance above the circular back plate;
   a tubular hub located at a center of the circular back plate; and
   a plurality of blades annularly disposed around the tubular hub between the circular back plate and the ring-shaped shroud, a chord line of each of the plurality of blades following a logarithmic spiral wave, a mean camber line of each of the plurality of blades provided with an angle of return against the logarithmic spiral function of the chord line, and a surface curvature of each of the plurality of blades distinct from the logarithmic spiral wave;
   wherein a leading edge of each of the plurality of blades has a curvilinear shape which is inwardly inclined toward an inner surface of said ring-shaped shroud with a twist or inclination angle.

6. An impeller structure for a centrifugal fan apparatus, the impeller structure comprising:
   a circular back plate;
   a ring-shaped shroud located a predetermined distance above the circular back plate;
   a tubular hub located at a center of the circular back plate; and
   a plurality of blades annularly disposed around the tubular hub between the circular back plate and the ring-shaped shroud, a chord line of each of the plurality of blades following a logarithmic spiral wave, a mean camber line of each of the plurality of blades provided with an angle of return against the logarithmic spiral function of the chord line, and a surface curvature of each of the plurality of blades distinct from the logarithmic spiral wave;
   wherein a leading edge of each of the plurality of blades has a curvilinear shape which is inwardly inclined toward an inner surface of said ring-shaped shroud with a twist or inclination angle;
   wherein the twist or inclination angle is ranging from about 30° to about 60°.

7. An impeller structure for a centrifugal fan apparatus, the impeller structure comprising:
   a circular back plate;
   a ring-shaped shroud located a predetermined distance above the circular back plate;
   a tubular hub located at a center of the circular back plate; and
   a plurality of blades annularly disposed around the tubular hub between the circular back plate and the ring-shaped shroud, a chord line of each of the plurality of blades following a logarithmic spiral wave, a mean camber line of each of the plurality of blades provided with an angle of return against the logarithmic spiral function of the chord line, and a surface curvature of each of the plurality of blades distinct from the logarithmic spiral wave;
   wherein a ratio of a horizontal distance w between a lower root and an upper root of leading edge of each of the plurality of blades and a distance R between a center and an outer periphery of the circular back plate satisfies the following condition:

$$0.2 \leq w/R \leq 0.4.$$

8. An impeller structure for a centrifugal fan apparatus, the impeller structure comprising:
   a circular back plate;
   a ring-shaped shroud located a predetermined distance above the circular back plate;

a tubular hub located at a center of the circular back plate; and a plurality of blades annularly disposed around the tubular hub between the circular back plate and the ring-shaped shroud, a chord line of each of the plurality of blades following a logarithmic spiral wave, a mean camber line of each of the plurality of blades provided with an angle of return against the logarithmic spiral function of the chord line, and a surface curvature of each of the plurality of blades distinct from the logarithmic spiral wave;

wherein the plurality of blades have a hollow structure such that concave portions are provided on an outer surface of the circular back plate around an area where a thickness of the plurality of blades are higher.

9. An impeller structure for a centrifugal fan apparatus, the impeller structure comprising:

a circular back plate;

a ring-shaped shroud located a predetermined distance above the circular back plate;

a tubular hub located at a center of the circular back plate; and a plurality of blades annularly disposed around the tubular hub between the circular back plate and the ring-shaped shroud, a chord line of each of the plurality of blades following a logarithmic spiral wave, a mean camber line of each of the plurality of blades provided with an angle of return against the logarithmic spiral function of the chord line, and a surface curvature of each of the plurality of blades distinct from the logarithmic spiral wave;

wherein the plurality of blades have a hollow structure such that concave portions are provided on an outer surface of the circular back plate around an area where a thickness of the plurality of blades are higher;

wherein concave portions are further provided around an outer periphery of said outer surface of the circular back plate.

10. An impeller structure for a centrifugal fan apparatus, the impeller structure comprising:

a circular back plate;

a ring-shaped shroud located a predetermined distance above the circular back plate;

a tubular hub located at a center of the circular back plate; and a plurality of blades annularly disposed around the tubular hub between the circular back plate and the ring-shaped shroud, a chord line of each of the plurality of blades defined as a logarithmic spiral function and a mean camber line of each of the plurality of blades provided with an angle of return against the logarithmic spiral function of the chord line, wherein an inclination of a leading edge of each of the plurality of blades is defined by an angle of about 30 to 60 degrees, the inclination of the leading edge formed between a straight line connecting a lower root of the leading edge and an upper root of the leading edge of each of the plurality of blades and an axis of rotation of the plurality of blades defined as a Z-axis.

11. The impeller structure as recited in claim 10, a thickness of each of the plurality of blades increases along the mean camber line from the leading edge to a position of maximum thickness located at a distance of about 1/5 to 1/3 away from said leading edge and then decreases from said position of maximum thickness to a trailing edge.

12. The impeller structure as recited in claim 10, wherein a ratio of a distance r between a center of the impeller to the lower root of the leading edge of each of the plurality of blades and a distance R between the center of the impeller to an outer periphery of the impeller satisfies the condition of $0.35 \leq r/R \leq 0.5$.

13. The impeller structure as recited in claim 10, wherein a maximum distance between a curvilinear line extending along the leading edge of each of the plurality of blades and a straight line connecting ends of said curvilinear line satisfies the condition of $0 \leq T \leq 0.3L$, wherein L is a length of the straight line.

14. The impeller structure as recited in claim 10, wherein a ratio of a horizontal distance w between a lower root and an upper root of the leading edge of each of the plurality of blades and a distance R between a center and an outer periphery of the circular back plate satisfies the condition of $0.2 \leq w/R \leq 0.4$.

15. The impeller structure as recited in claim 10, wherein each of the plurality of blades has a curved surface extending along a length of the plurality of blades from the tubular hub towards an outer periphery of the impeller structure.

16. The impeller structure as recited in claim 10, wherein the plurality of blades have a hollow structure such that concave portions are provided on an outer surface of the circular back plate around an area where a thickness of the plurality of blades are higher.

17. The impeller structure as recited in claim 16, wherein concave portions are further provided around an outer periphery of said outer surface of the circular back plate.

18. An impeller structure for a centrifugal fan apparatus, the impeller structure comprising:

a circular back plate;

a ring-shaped shroud located a predetermined distance above the circular back plate;

a tubular hub located at a center of the circular back plate; and a plurality of blades annularly disposed around the tubular hub between the circular back plate and the ring-shaped shroud, a chord line of each of the plurality of blades defined as a logarithmic spiral function and a mean camber line of each of the plurality of blades provided with an angle of return against the logarithmic spiral function of the chord line, wherein a thickness of each of the plurality of blades increases along the mean camber line from a leading edge to a position of maximum thickness located at a distance of about 1/5 to 1/3 away from said leading edge and then decreases from said position of maximum thickness to a trailing edge, a ratio of a distance r between a center of the impeller to the lower root of the leading edge of each of the plurality of blades and a distance R between the center of the impeller to an outer periphery of the impeller satisfies the condition of $0.35 \leq r/R \leq 0.5$, an inclination of a leading edge of each of the plurality of blades is defined by an angle of about 30 to 60 degrees, the inclination of the leading edge formed between a straight line connecting a lower root and an upper root of the leading edge of each of the plurality of blades and an axis of rotation of the plurality of blades defined as a Z-axis, a maximum distance between a curvilinear line extending along the leading edge of each of the plurality of blades and a straight line connecting ends of said curvilinear line satisfies the condition of $0 \leq T \leq 0.3$, where L is a length of the straight line, a ratio of a horizontal distance w between a lower root and an upper root of the leading edge of each of the plurality of blades and a distance R between a center and an outer periphery of the circular back plate satisfies the condition of $0.2 \leq w/R \leq 0.4$.

* * * * *